Oct. 25, 1960 H. S. VAN BUREN, JR 2,957,219
WEBBING CLIP
Filed Nov. 10, 1958

INVENTOR:
HAROLD S. VAN BUREN JR.,
BY Walter J. Jones
ATTORNEY.

United States Patent Office 2,957,219
Patented Oct. 25, 1960

2,957,219

WEBBING CLIP

Harold S. van Buren, Jr., Cambridge, Mass., assignor to United-Carr Fastener Corporation, Cambridge, Mass., a corporation of Delaware Filed Nov. 10, 1958, Ser. No. 772,818

4 Claims. (Cl. 24—73)

This invention relates generally to improvements in webbing fasteners and more specifically to furniture webbing clips.

A primary object of the invention is to provide an improved fastener of the type adapted to hold a strip of tautly drawn webbing to an apertured frame.

A further object of the invention is to provide a one piece webbing fastener which may be simply and inexpensively formed from one piece of material.

Other objects of the invention will, in part, be obvious, and will, in part, appear hereinafter.

The illustrated embodiment of the invention provides a webbing clip adapted to be attached to an apertured frame formed of tubing 10 and to hold a strip of webbing 12 or the like stretched over the frame and the area formed thereby. The frame may be formed into any convenient geometric design, particularly those usually found in tubular furniture.

Figure 1:
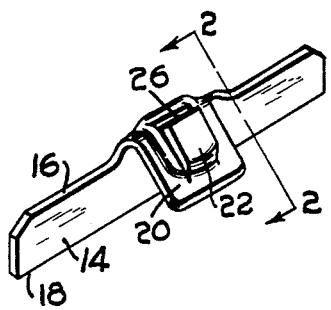
Fig. 1 is an enlarged perspective view of a fastener embodying the features of the invention.
Figure 2:
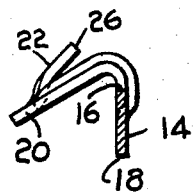
Fig. 2 is a cross section taken on line 2—2 of Fig. 1.

Referring to Figs. 1 and 2 of the drawing, there is shown a webbing fastener comprising a substantially rectangular flat base 14 having a leading edge 16 and a trailing edge 18 and a prong 20 in acute angular relation thereto as shown in Fig. 2. A detent 22 is integral with said prong 20 on one of its sides only and has a forward edge 26 pointing in the direction of the plane on which the base 14 lies.

Figure 3:
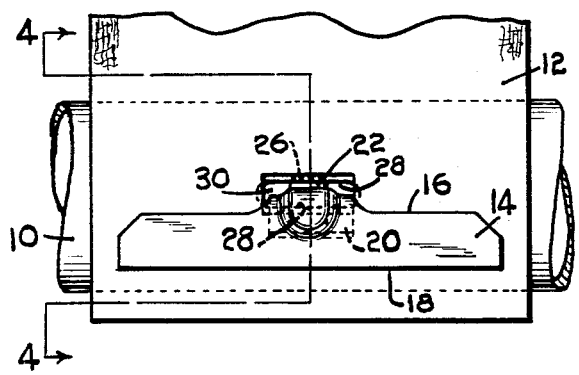
Fig. 3 is an enlarged front elevation partly in section, showing the fastener applied to a piece of tubing.
Figure 4:
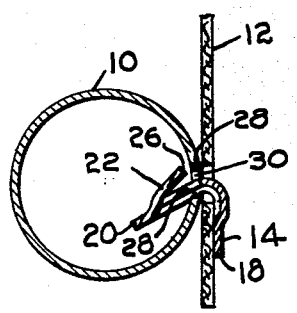
Fig. 4 is a cross section taken on line 4—4 of Fig. 3.
Figure 5:
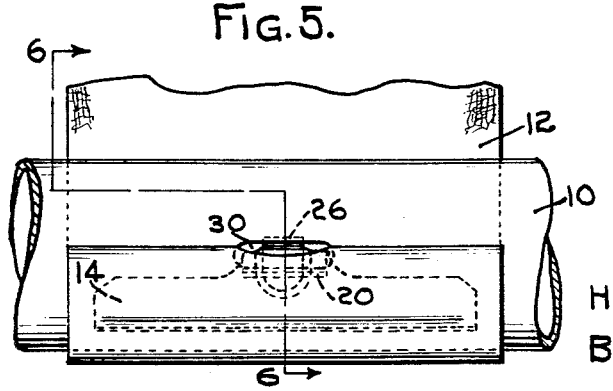
Fig. 5 is an enlarged front elevation, partly in section, of the assembly of the fastener with the webbing under tension.
Figure 6:
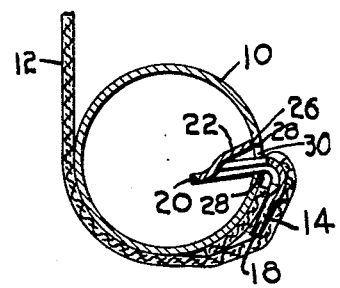
Fig. 6 is a cross section taken on line 6—6 of Fig. 5.

To engage the clip to a strip of webbing 12 and a tubing 10 located in a frame, the prong 20 is passed through the webbing 12 so that the base 14 lies flatly against the webbing on one side and the forward edge 26 of the detent 22 lies on the other side of said webbing. Any aperture formed in the webbing 12 which will allow the prong 20 to pass through but will prevent the base 14 from passing through will serve. The walls of this aperture may be protected by an eyelet or the like. The prong 20 is then passed between the walls 28 of an aperture 30 formed in a side of the tubing 10. The form of the aperture 30 may be circular, elliptical, rectangular or any geometric form desired, however, the width of the aperture 30 must be such that it is slightly smaller than the distance between the forward edge 26 of the detent 22 and the surface of the prog 20. The detent 22 is compressed toward the surface of the prong 20 by one of the walls 28 of the aperture 30 and then snaps in back of the wall when the forward edge 26 passes the wall. At this point, the webbing 12 is loosely connected to the tubing 10 as illustrated in Figs. 3 and 4. The webbing 12 is then bent back on itself so that the leading edge 16 of the base 14 rests against the webbing. The webbing 12 is also drawn over a portion of the tubing 10 as illustrated in Fig. 6. As the webbing is pulled taut, the forward edge 26 of the detent 22 is forced against the inside wall of the tubing 10. Where the tubing 10 is part of a frame, for this purpose square in form, and the other end of the webbing also has applicant's fastener engaged as set forth herein, the webbing will be securely held against the ordinary strains to which furniture is subjected.

Since certain other obvious modifications may be made in this device without departing from the scope of the invention, it is intended that all matter contained herein be interpreted in an illustrative and not in a limiting sense.

I claim:

1. The combination of a tubular frame having at least one lateral rectangular opening formed therein, webbing partially looped about said frame and a fastening device, said fastening device comprising a base plate having a leading and a trailing edge, a prong of less width than said base plate and integral with said leading edge in an angular relationship therewith of less than 90° and extending through said opening in said frame, a detent integral with said prong having a free end portion and disposed on the face of said prong opposite to the face toward said base plate, said detent having a frame engaging forward edge extending in the direction of said base plate, said forward edge being the free end portion of said detent, the distance between said forward edge of said detent and the face of said prong toward the base being greater than the dimension of the opening in the frame, said webbing looped over said leading edge of said base plate, whereby the forward free end of said detent engages a portion inside said tubular frame adjacent the opening when force is applied to the webbing in a direction directed from the leading toward the trailing edge of the base plate.

2. The combination of a tubular frame having at least one lateral rectangular slot formed therein, webbing partially looped about said frame and a fastening device, said fastening device comprising a base plate having a leading and a trailing edge, a prong of less width than said base plate and integral with said leading edge in acute angular relationship therewith and positioned in said rectangular slot, a detent integral with said prong having a free end portion disposed on the face of said prong opposite to the face toward said base plate, said detent having a frame engaging forward edge extending in the direction of said base plate, said forward edge being the free end portion of said detent, said webbing looped over said leading edge of said base plate whereby the forward free end of said detent engages a portion inside said tubular frame adjacent the rectangular slot when force is applied on the webbing in a direction directed from the leading toward the trailing edge of the base plate.

3. A fastening device for retaining webbing material to a tubular frame having a lateral opening thereon, said fastening device comprising a base plate having a leading and trailing edge, a prong of less width than said base plate and integral with said leading edge and in angular relationship therewith of less than 90° and adapted to be inserted in said opening in said frame, and a detent integral with said prong having a free end portion and disposed on the face of said prong opposite to the face toward said base plate, said detent having a frame engaging forward edge extending in the direction of said base plate, said forward edge being the free end portion of said detent, the distance between said forward edge of said detent and said prong being greater than the dimension of the opening in the frame with which said fastener is to be used.

4. A fastening device for retaining webbing material to a tubular frame having an opening centrally thereon, said fastening device comprising a base plate having a leading and trailing edge, a prong throughout its length being of less width than said base plate and extending adjacent said leading edge in angular relationship and adapted to be inserted in the said opening in said tubular frame, and a detent having a free end portion integral with said prong and disposed on the face of said prong opposite to the side facing said base plate, said detent having a frame engaging forward edge extending in the direction of the plane of said base plate, said forward edge being the free end portion of said detent, the distance between said forward edge of said detent and the face of said prong facing the plate being greater than the dimension of the opening in the frame with which said fastener is to be used.

References Cited in the file of this patent

UNITED STATES PATENTS

| | | |
|---|---|---|
| 2,703,604 | Becker | Mar. 8, 1955 |
| 2,817,392 | Thomas | Dec. 24, 1957 |
| 2,845,671 | Fisher et al. | Aug. 5, 1958 |
| 2,879,570 | Becker | Mar. 31, 1959 |